US011845424B2

(12) United States Patent
Van Wiemeersch et al.

(10) Patent No.: US 11,845,424 B2
(45) Date of Patent: Dec. 19, 2023

(54) REMOTE TRAILER BACKUP ASSIST MULTIPLE USER ENGAGEMENT

(71) Applicant: Ford Global Technologies, LLC, Dearborn, MI (US)

(72) Inventors: John Robert Van Wiemeersch, Novi, MI (US); Erick Michael Lavoie, Van Buren Charter Township, MI (US); Hamid M. Golgiri, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 152 days.

(21) Appl. No.: 17/652,024

(22) Filed: Feb. 22, 2022

(65) Prior Publication Data
US 2023/0264686 A1    Aug. 24, 2023

(51) Int. Cl.
*B60W 30/06* (2006.01)
(52) U.S. Cl.
CPC ......... *B60W 30/06* (2013.01); *B60W 2300/14* (2013.01); *B60W 2756/10* (2020.02)
(58) Field of Classification Search
CPC .................................................... B60W 30/06
USPC .............................................................. 701/2
See application file for complete search history.

(56) References Cited

U.S. PATENT DOCUMENTS

| 9,829,883 | B1 * | 11/2017 | Lavoie | G05D 1/0022 |
| 10,976,733 | B2 * | 4/2021 | Lavoie | B60D 1/245 |
| 2019/0202444 | A1 | 7/2019 | Golgiri et al. | |
| 2020/0047745 | A1 | 2/2020 | Suzuki et al. | |
| 2020/0207333 | A1 | 7/2020 | Miller et al. | |
| 2020/0393826 | A1 | 12/2020 | Golgiri et al. | |
| 2021/0229509 | A1 | 7/2021 | Raeis Hosseiny et al. | |
| 2021/0269092 | A1 * | 9/2021 | Golgiri | B60D 1/62 |
| 2022/0334578 | A1 * | 10/2022 | Raeis Hosseiny | H04M 1/72448 |

OTHER PUBLICATIONS

Remote Control Parking System, https://www.designboom.com/project/remote-control-parking-system/ (Aug. 23, 2021).

* cited by examiner

*Primary Examiner* — Peter D Nolan
*Assistant Examiner* — Luke Huynh
(74) *Attorney, Agent, or Firm* — Frank Lollo; Eversheds Sutherland (US) LLP

(57) ABSTRACT

Systems and methods for operating a vehicle during a remote trailer parking operation include receiving, via a processor, a control instruction from a first mobile device indicative of a first curvature command providing directional control of a vehicle, and a first user engagement indicator. The processor may receive, from a second mobile device, a second control instruction from a second mobile device, the second control instruction can include a second user engagement indicator. The system may determine, based on the first user engagement indicator that first user engagement meets a threshold, and determine, based on the second user engagement indicator that second user engagement meets a threshold. Responsive to determining user engagement with the trailer parking procedure, the processor may cause a vehicle controller to operate the vehicle to park a trailer pivotably disposed with the vehicle based on the first curvature command, the first user engagement indicator, and the second user engagement indicator, to complete a remote trailer parking operation.

34 Claims, 7 Drawing Sheets

REMOTE TRAILER BACKUP ASSIST MULTIPLE USER ENGAGEMENT

BACKGROUND

Operating a vehicle with a trailer in tow may be challenging for some drivers. This is particularly true for drivers that are not used to backing up vehicles with attached trailers. Trailer backup assist systems for vehicles may include an onboard user interface that allows the user to steer a trailer towed by the vehicle through an automated steering controller that provides the steering motion that moves the trailer along a user-defined straight path or curvature.

When using a Remote Trailer Maneuver Assist (ReTMA) system, it is desirable to require a User Engagement signal from the remote device as a confirmation that the user intends vehicle motion. In some cases, the vehicle and/or trailer may be maneuvering in a tight space where there are tight clearances at multiple locations around the perimeter and/or elevation of the vehicle and/or trailer. In some conventional ReTMA systems, vehicle sensors establish about a 30 cm virtual bumper to mitigate undesirable contact with an object during parking procedures. However, there currently are no such similar virtual bumpers for the trailer perimeter or above the vehicle or trailer.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1A:
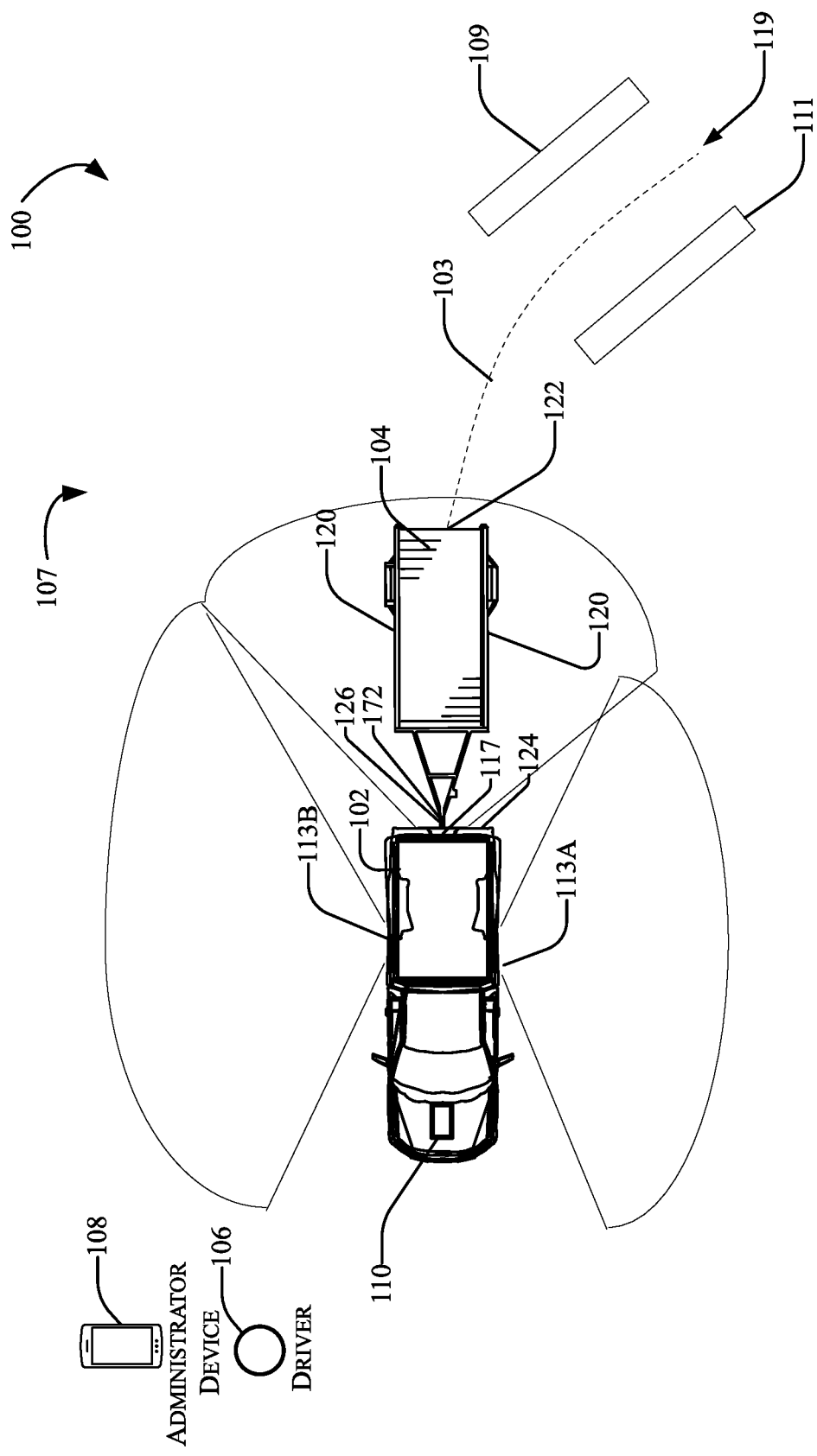
FIG. 1A depicts an example trailer backup assist system according to embodiments of the present disclosure.

Systems and methods for using multiple devices for ReTMA control functions are described. Disclosed embodiments connect multiple mobile devices with the ReTMA system for collective monitoring of ReTMA trailer maneuvering operations, and group control of the operation using wirelessly connected mobile devices.

Three main embodiments are described in accordance with the present disclosure. A first embodiment configures mobile devices of one or more spotters operating spotter device(s) disposed at critical locations around a remote trailer maneuver operation to monitor and control the operation in concert with a lead operator device having primary ReTMA control. The spotter device(s) and the lead operator device may share control of the remote trailer maneuver operation. In one aspect, the owner/administrator of ReTMA may be holding the operator device (also referred to as the administrator device or the lead operator device) and may configure a ReTMA application operable on the lead operator device decide to control vehicle motion and curvature commands Such control may be useful when performing a ReTMA maneuver in the presence of multiple obstacles or tight clearances at one or more spots around the vehicle-trailer pair. The lead operator device may administer full control while receiving images or other control signals from spotter devices. In other aspects, the lead operator device may assign control authority configuring spotter devices to perform aspects of control of the trailer maneuver operation such as steering, braking, etc. The lead operator device may serve as a gatekeeper for ReTMA control signals that are shared in whole or in part by one or more other connected devices (e.g., the spotter devices).

According to one or more embodiments, any connected smart device (e.g., a smartphone, fob, or tablet) may be configurable by the system to be a ReTMA device enabled to engage in a multiple controller remote control operation.

In a second embodiment, the cooperative backup assist system may configure multiple remote devices for assistance to teach or train an inexperienced user operating the lead operator device. For example, an owner/administrator of a ReTMA-enabled vehicle and/or trailer may shadow an inexperienced user in training or other environmental situations such as operations with low-clearance trailer parking situations. In one aspect, the lead-operator device may transmit a control signal to the spotter device indicative of granted permission for the new user to operate ReTMA remotely from a 2nd mobile device, such as a smartphone, tablet, fob, wearable smart device, etc., while the lead operator device may maintain override capability using the lead operator device. The second embodiment may be analogous to a driver training instructor that uses a redundant steering wheel, brake or accelerator control in parallel with the driver seat controls being used by a vehicle operator trainee.

According to a third embodiment, an operator device may increase obstacle avoidance due to vehicle-identified blind spots and/or tight clearances between the vehicle and/or trailer and obstacles/obstructions by identifying a blind spot and/or a probability of tight clearances that exceeds a threshold, and then generating a message recommending more than one spotter. The cooperative backup assist system may also recommend a location for the spotter to stand on the ground for an optimized vantage point (e.g., a particular vehicle or trailer corner, side, front, or vehicle-trailer rear position), suggest that a spotter be in an elevated position (e.g., on a second floor of a building, a catwalk, etc.), and/or present the location of the spotters on a display of each spotter device, such as in a map view. In some aspects, the cooperative backup assist system may further suggest an approximate distance from the vehicle (i.e., to better see overhead obstructions) at which the spotter may optimally stand to provide the optimal vantage point.

The disclosed methods and system(s) herein may be useful in a trailer reverse system that can assist drivers in operating a vehicle towing a trailer, such as a box trailer or a recreational vehicle (RV) or the like, in reverse gear without a spotter to help the driver, and without adding additional wiring connections or an upgraded onboard control module to the towing or towed vehicle.

These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

FIG. 1A depicts an example cooperative backup assist system 107 (discussed in greater detail with respect to FIG. 2) in an example ReTMA operating environment 100, according to embodiments of the present disclosure. The cooperative trailer backup assist system 107 may be utilized for cooperative control of a towing vehicle 102 to cause a trailer 104 attached to a vehicle 102 to travel along a back-up path 103 by allowing a driver of the vehicle 102 (also referred to herein as an operator or user) to operate an administrator device 108 to specify a desired back-up path 103 shown as a curvature of here (though the path may also be a straight line). The cooperative backup assist system 107 may provide command control permission to one or more secondary devices operated by spotters (second, third, etc. users) that may be positioned at key points to provide additional views of areas that may have environmental features or obstacles to be avoided during the parking operation.

The cooperative backup assist system 107 may include a control module 110 rigidly disposed onboard the vehicle 102. The control module 110 may be disposed in communication with one or more sensory devices on the vehicle 102, including for example, one or more side sensory devices 113A and 113B, one or more rear vehicle sensors 117, or other sensory devices not shown. The sensory devices 113A, 113B, and 117 may provide sensory input indicative of one or more users, environmental features, and/or obstacles in the ReTMA operating environment 100. The vehicle sensory devices 113A, 113B, and 117 may include LiDAR, RADAR, red-green-blue (RGB) camera systems, infrared camera systems, inertial measurement units (IMUs), or other sensory devices. Collectively, vehicle sensory devices 113A, 113B, and 117 are referred to as being part of a vehicle sensory system.

In one embodiment, the cooperative backup assist system 107 may include one or more trailer sensory devices 122, attached to a rear portion of the trailer 104, and/or one or more trailer sensory devices 120 disposed on or near one or more trailer side panels or frame members. The vehicle sensory system may be configured and/or programmed to provide sensory output signals indicative of objects, pedestrians, and other environmental features disposed proximate to the trailer 104. The control module 110 may run an Intelligent Platform Management Bus (IPMB) Communications Protocol. Other protocols are possible, and contemplated. The trailer sensory devices 120 and 122 may include LiDAR, RADAR, red-green-blue (RGB) camera systems, infrared camera systems, inertial measurement units (IMUs), or other sensory devices.

The vehicle 102 may be a pickup truck or other towing vehicle equipped with the trailer backup assist system for controlling the back-up path of the trailer 104 that is attached to the vehicle 102. Specifically, the vehicle 102 is pivotally attachable to the trailer 104 via a tongue 172 longitudinally extending forward from or proximate to the vehicle rear bumper 124. The illustrated trailer 104 is depicted in FIG. 1 as being hitched to the vehicle 102 via a trailer hitch 126. It should be appreciated that the vehicle 102 and/or the trailer 104 may take any shape, form, or configuration.

Figure 1B:
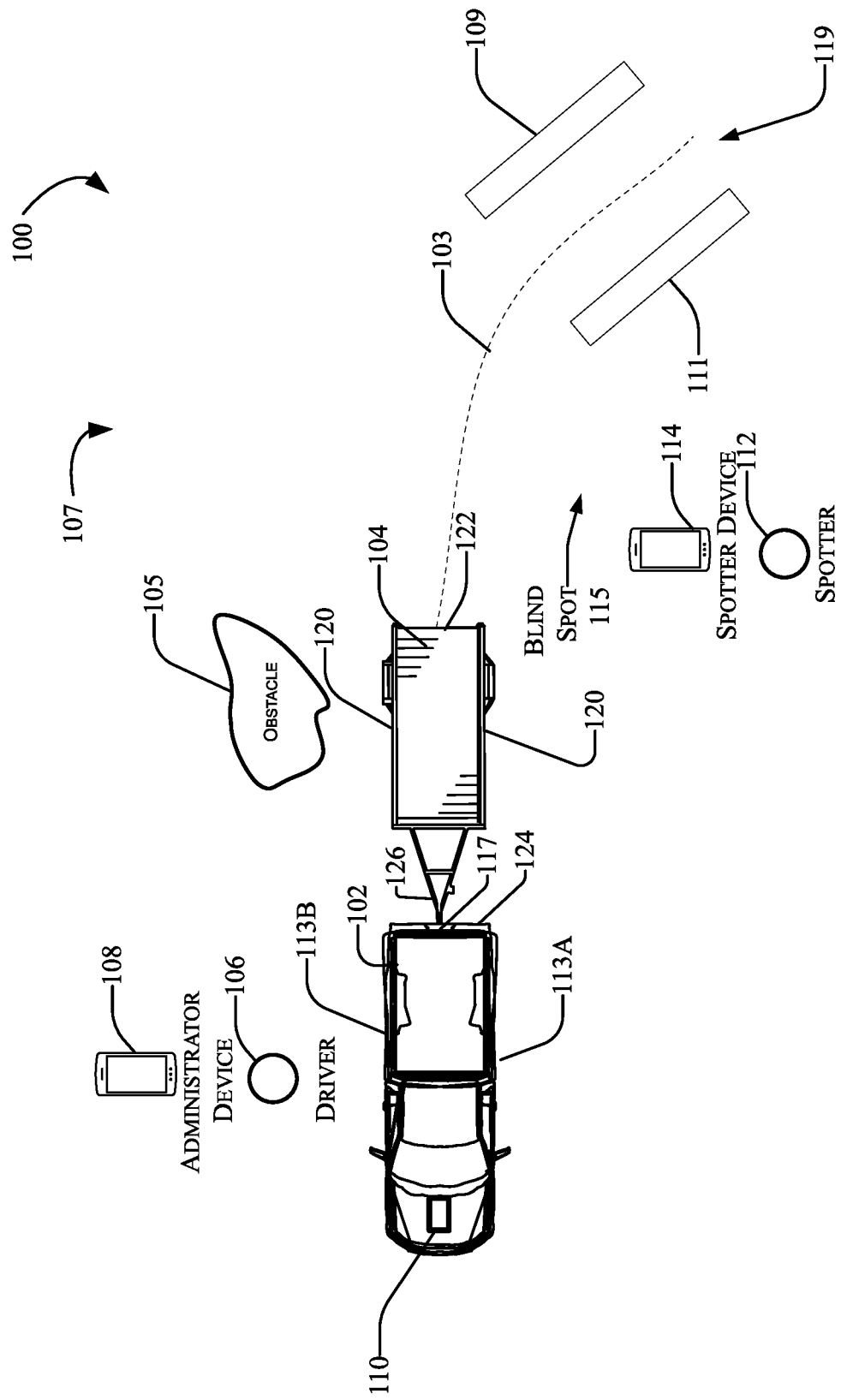
FIG. 1B depicts another example trailer backup assist system according to embodiments of the present disclosure.
Figure 1C:
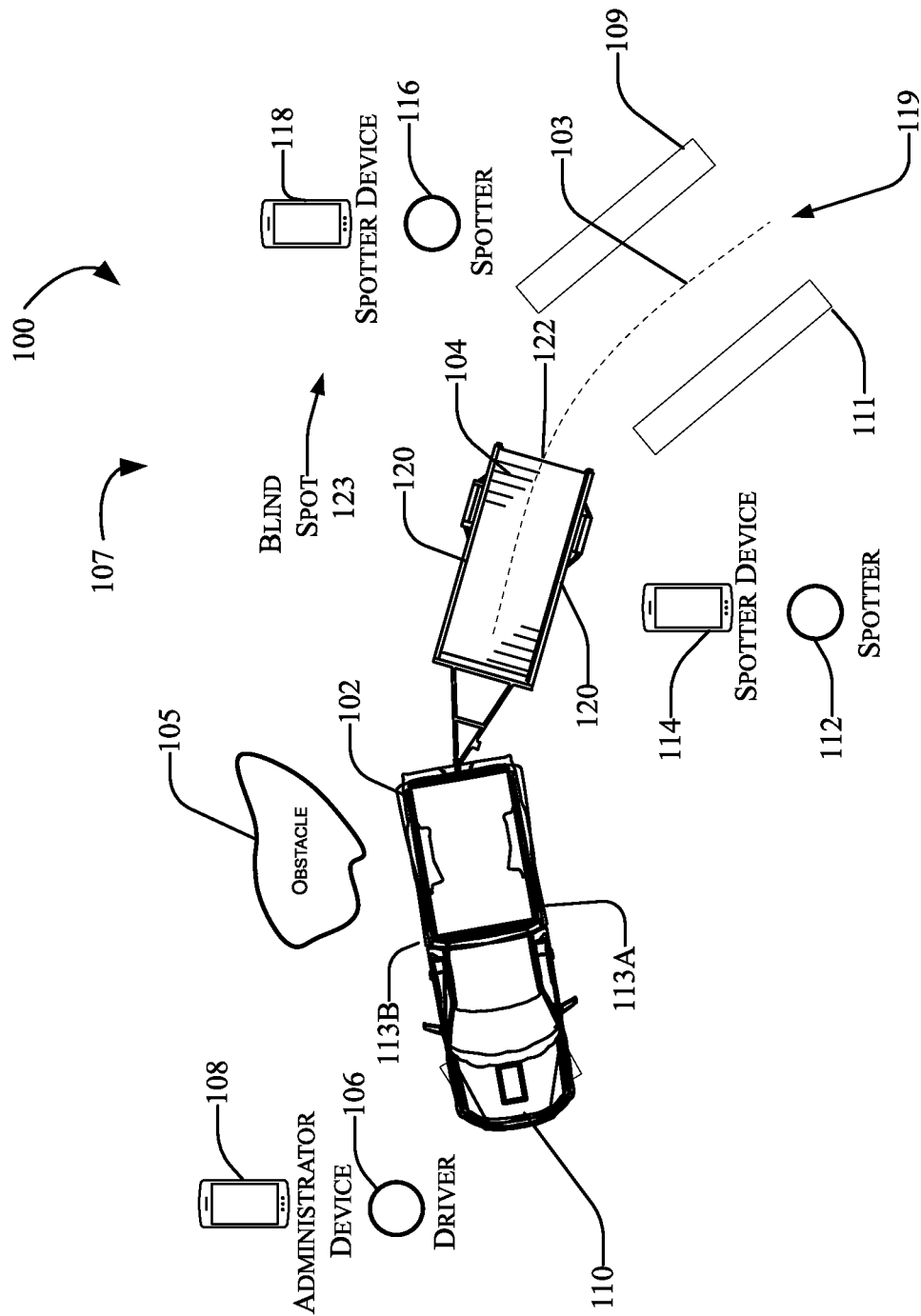
FIG. 1C depicts another example trailer backup assist system according to embodiments of the present disclosure.
Figure 1D:
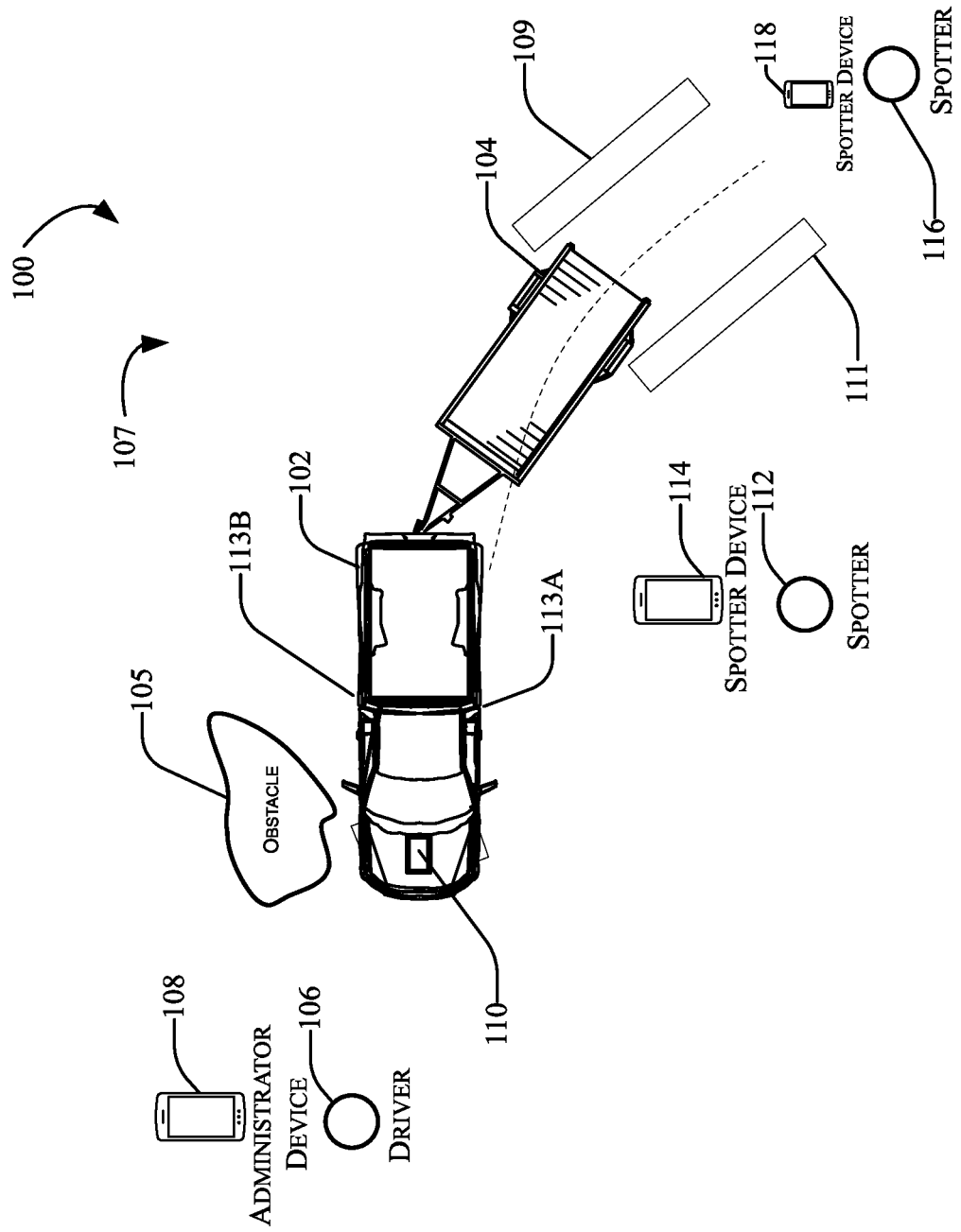
FIG. 1D depicts another example trailer backup assist system according to embodiments of the present disclosure.

FIGS. 1B, 1C, and 1D illustrate a trailer backup scenario where the vehicle 102 and trailer 104 are operating in the ReTMA operating environment 100 having one or more obstacle such as, for example, an obstacle 105. The obstacle 105 is illustrated as an example environmental feature, such as a boulder or structure that may be typical in a trailer parking scenario. As the user/driver 106 operates the vehicle 102, they would ideally position themselves at a vantage point that provides a view of the obstacle 105, the vehicle 102, the trailer 104, and a target location or parking destination 119. In FIG. 1B, the trailer 104 is positioned at a beginning of the trailer backup maneuver, and the user/driver 106 has the goal of avoiding the obstacles 105, 109 and 111 proximate to the location at which the trailer 104 is to be parked. The example depicted in FIG. 1B further shows a second ReTMA user 112 (also referred to as spotter 112) positioned proximate to the vehicle 102 and the trailer 104 to perform the trailer parking operation that includes navigating the vehicle 102 by parking the trailer 104 at a parking destination 119 shown between two obstacles 109 and 111. During the trailer maneuver operation, the driver 106 may have the objective to avoid the obstacle 105 as the vehicle 102 maneuvers the trailer 104 to the parking destination 119 between the two obstacles 109 and 111.

A user 106, who is illustrated in FIG. 1 as having a front-right vehicle view of the remote parking operation may have a clear view of one side of the vehicle 102 and the trailer 104 but may not be positioned sufficiently to see the opposite side of the vehicle 102. Consequently, there may be situations where blind spots during a remote parking operation may be disadvantageous to the user 106 of a lead ReTMA mobile device 108 as they operate the mobile device 108 to control the vehicle 102.

In some aspects, it may be advantageous to have more than one person operating a connected mobile device act as a spotter, where the second (or more) spotters/spotter devices may assist the driver/user 106 by monitoring the vehicle 102 and/or trailer 104 during the remote trailer parking operation. For example, as shown in FIG. 1B, the cooperative backup assist system 107 and/or the user 106 may determine that one or more blind spots 115 are present in the ReTMA operating environment 100 such that a single user from a single viewing position may not have the most advantageous view(s) of all areas of a trailer parking maneuver due to the presence of one or more obstacle(s) 105, 109, and/or 111. In one aspect, the cooperative backup assist system 107 may determine that it can be advantageous for a secondary user (referred to herein as a second spotter 116), to be positioned such that they have a clear view of one corner of the vehicle 102 and an obstacle 105 to be avoided during the operation. The spotter 112 may therefore provide an additional viewing angle that alleviates the blind spot 115. In one aspect, as explained in further detail hereafter, the cooperative backup assist system 107 may determine that there are obstacles, blind spots, or other aspects of the parking maneuver that would decrease a probability of interference with obstacles by positioning the spotter 112 (and a spotter device 114 such as a connected mobile device) proximate to the blind spot 115. As the vehicle 102 proceeds along the back-up path 103, the driver 106 has a view of the obstacle 105, and the spotter 112 has a view of the obstacle 111 and rear-left corner of the trailer 104. The administrator device 108 may connect with the spotter device 114 to share command control responsibilities such as vehicle starting, stopping, and curvature command that causes the trailer 104 to follow the back-up path 103.

For example, in one aspect, the spotter device 114 and the lead operator (administrator) device 108 may share control of the remote trailer maneuver operation. In one aspect, the owner/administrator of ReTMA (the driver 106) may control the administrator device 108 and may configure a ReTMA application (not shown in FIG. 1B) to be operable on the administrator device 108 for control of the vehicle motion (start, stop, speed) and curvature (steering that causes the trailer 104 to follow the back-up path 103). Such control may be useful when performing a ReTMA maneuver in the presence of the multiple obstacles (105, 109, 111, etc.) or tight clearances at one or more spots around the vehicle-trailer pair.

The administrator device 108 may administer full control of the vehicle 102 via the control module 110 while receiving images or other control signals from the spotter device 114. In other aspects, the administrator device 108 may assign control authority to the spotter device 118. The control authority may configure the spotter device 118 to perform aspects of control of the trailer maneuver operation such as steering, braking, etc. The administrator device 108 may serve as a gatekeeper for ReTMA control signals that are shared in whole or in part by one or more other connected devices (e.g., the spotter device 114). In some aspects, the driver 106 and the spotter 112 may enable continued vehicle operation by actuating a user engagement button or feature (not shown in FIG. 1B) that indicates that all connected users 106 and 112 are actively engaged and giving attention to the parking maneuver. If one or more of the users 106, 108, etc. disengages the user engagement button on their respective device, the cooperative backup assist system 107 may immediately stop vehicle 102 motion, generate a message indicative of instructions for re-engaging the user engagement feature, and continue operation. This feature also allows for an immediate stop of all vehicle motion when one or more of the driver 106 and spotter 112 determines that a collision may occur, or an adjustment to vehicle speed, curvature, or other control aspects should be altered from a present status.

According to one or more embodiments, any connected smart device (e.g., a smartphone or tablet) may be configurable by the system to be a ReTMA device enabled to engage in a multiple controller remote control operation.

FIG. 1C depicts the cooperative backup assist system 107 as it configures multiple remote devices for assistance to teach or train an inexperienced user operating the lead operator device. For example, the owner/administrator (e.g., the driver 106) of the vehicle 102 and/or trailer 104 may shadow an inexperienced user (e.g., the spotter 112) in training or other environmental situations such as operations with low-clearance trailer parking situations. In one aspect, the administrator device 108 may transmit a control signal (not shown in FIG. 1C) to the spotter device 114 indicative of granted permission for the new user (the spotter 112) to operate ReTMA remotely from a spotter device 114, while the lead operator device 108 maintains override capability using the lead operator device. This feature may be analogous to a driver training instructor that uses a redundant steering wheel, brake or accelerator control in parallel with a vehicle operator trainee.

For example, the spotter 112 may have limited experience in controlling curvature command during a trailer backup procedure and over-steer the vehicle 102 to cause the trailer 104 to follow the back-up path 103. The driver 106 may observe the over-steering curvature command and override the curvature command signal coming from the spotter device 114 using an interrupt button or other user interface feature (not shown in FIG. 1C) to re-gain control of the curvature command and correct the over-steering error using the administrator device 108. The control module 110 may receive the override signal and immediately implement the new curvature command that causes the vehicle 102 to accurately follow the back-up path 103 while avoiding the obstacle 105. For example, according to one or more embodiments, the system 107 may provide instructions that, when executed by one or more processors of a respective device, cause the device to output a human-machine interface having the interrupt button available to the driver 106 such that the driver may actuate the interrupt button during operation of the vehicle. In other aspects the human-machine interface may provide one or more settings/controls (not shown in FIG. 1) that provide system adjustments and settings that, when changed, affect the same change on all or some of the connected devices.

For example, the one or more connected devices may be operated by spotter(s) disposed at one or more locations proximate to the vehicle 105. The driver 106 can select a control option using the human-machine interface (HMI) indicative that location-based enforcement is enabled, where the interface provides one or more user-selectable positions on a map, and accepts indicative user input of desired locations for respective spotters/spotter devices on the map. Thus, the location of the spotter/spotter devices may be viewable by each other via the HMI on each spotter device. In this example, the spotters can then move with their spotter devices to the designated locations. In another example, the driver may be provided a map editing interface using the HMI to draw a perimeter around a particular location, choose a radius magnitude associated with a curvature command, etc. This information may then be sent to each spotter device for presentation via the HMI, such as in a map view.

According to another aspect, the administrator may set a default requirement for vehicle motion to be associated with, for example, two or more user engagement signals and/or curvature commands from two connected devices but designate one or more particular locations or spotter devices to be exempt from the default requirement.

According to another aspect, the cooperative backup assist system 107 may increase obstacle avoidance due to vehicle-identified second blind spot and/or tight clearances between the vehicle 102 and/or trailer 104 and additional obstacles/obstructions (e.g., the obstacles 109 and 111) by identifying the blind spot via the vehicle sensory devices 113A, 113B, 117, etc., and or the trailer sensory devices 122. The cooperative backup assist system 107 may evaluate or determine a probability of tight clearances that exceeds a threshold (e.g., less than a threshold distance of 0.5 meters, 1 meter, etc., between a vehicle or trailer surface and the detected obstacle), and a message recommending more than one spotter.

The cooperative backup assist system 107 may further recommend a location for the second (or more) spotters to stand on the ground for an optimized vantage point (e.g., a particular vehicle or trailer corner, side, front, or vehicle-trailer rear position), or suggest that a spotter be in an elevated position (e.g., on a second floor of a building, a catwalk, etc.). As illustrated in FIG. 1C, the cooperative backup assist system 107 may recommend that a second spotter 116 be positioned at a rear-right position respective to the trailer 104 to observe the clearance and curvature of the trailer 104 as it avoids the obstacle 109.

To make this determination, the cooperative backup assist system 107 may detect the obstacle 105 via the trailer sensory device 122, localize the spotter device(s) 108, 114, and 118 (which may be indicative of a position of the user operating the spotter devices) determine via the control module 110 that a view to one or more obstacles 105, 111, 109 may be obstructed from one or more of the spotter 112, the spotter 116, and/or the driver 106 based on localization made for respective devices 108, 114 and/or 118. In some aspects, the control module 110 may determine the localized position(s) of the driver 106, the first spotter 112, and/or the second spotter 116 via the vehicle sensory system, via one or more GPS signals received from the devices 108, 114, and/or 118, or via other localization techniques such as Wi-Fi localization, Ultra-Wide Band (UWB), etc., where the sensory systems for the vehicle 102, trailer 104, or the mobile device sensory devices (not shown in FIG. 1C) inform the control module 110 of the respective positions of the devices 108, 114, 118, respective positions of the users 106, 112, and/or 116, respective positions of the vehicle 102 and/or the trailer 104 and respective positions of the obstacles 105, 109, and/or 111.

The control module 110 may include (store on a computer-readable memory not shown in FIG. 1C) information indicative of physical geometry of both the vehicle 102 and the trailer 104, and determine a probability of clear view of the blind spot based on the vehicle and trailer dimensions, and further based on the respective positions of the connected devices 108 and 114. An example threshold probability may be 20% probability of an unobstructed view, 50% probability of an unobstructed view, etc.

In some aspects, responsive to determining a probability of obstructed view from one or more connected devices such as, for example, the administrator device 108, the cooperative backup assist system 107 may further suggest an approximate distance from the vehicle 102 or the trailer 104 at which a spotter (e.g., 112) is ideally positioned to provide an advantageous view of an obstruction or obstacle. In other aspects, the cooperative backup assist system 107 may determine that more than the current number of connected spotters be used in a particular parking operation such that the user 106 and spotter team may work together to control the vehicle 102.

FIG. 1C illustrates a third user (e.g., spotter 116) positioned at an opposite side of the vehicle 102, which may provide a clear view of the obstacle 111. Furthermore, the owner of the vehicle 102 (whom may be, for example, the operator of the administrator device 108) or the system 107 may determine that the second blind spot 123 may be alleviated with the addition of a second spotter 116 to use a spotter device 118 to add command control signals to the cooperative parking procedure.

In circumstances similar to the situation depicted in FIGS. 1B and 1C, it may be advantageous for multiple users to provide user engagement and/or curvature commands authorizing vehicle motion with the assistance of co-operators (e.g., the first spotter 112 operating the spotter device 114 and the second spotter 116 operating the spotter device 118) rather than the user 106 stopping or pausing the trailer parking assist operation and moving around to the location(s) (e.g., the positions of the first spotter 112 and/or the second spotter 116), where there are tight clearances present between the vehicle 102 and/or the trailer 104 and obstacles 105, 109, and 111. The disclosed system 107 may provide a clear view to blind spots where obstacles are present. It may be an additional advantage for the cooperative backup assist system 107 to determine a current position of a user, evaluate the ReTMA operating environment 100 for potential blind spots, and determine that a second position offers greater view advantage than a first location of one or more of the users 106, 112, and/or 116. For example, as shown in FIG. 1D, the cooperative backup assist system 107 may determine that it is advantageous toward the final stage of the remote parking procedure that the spotter 116 stand at a second location that provides a view of the trailer 104 as it becomes proximate to the obstacles 109 and 111. The cooperative backup assist system 107 may cause the vehicle 102 to stop, generate a message for output on the devices 108, 114, and/or 118 indicative of a second (new) position for the spotter device 118 that provides the improved vantage point, and indicate an instruction that, when followed, causes the spotter device 118 to observe the final stage of the parking procedure from the new location.

Conventional backup assistance systems may be impractical, as the required video system for single-user control of the vehicle 102 may or may not be sufficient to see the opposite vehicle corners or obstacles that may be obstructed due to vehicle 102, trailer 104, and/or obstacle 105, 109, and/or 111 geometry. To mitigate potential damage to the trailer 104, it may be advantageous to include two or more connected wireless mobile devices 108, 114, and 118, etc., which may be configured and/or programmed to maintain engagement with the parking operation by connecting with the control module 110 and/or connecting with each other wirelessly via Bluetooth®, Wi-Fi, or other wireless connection methods while providing a clear view of blind spots and obstacles.

As used herein, a spotter may be an individual user providing control instructions via a spotting device at strategic vantage points where observing (via a camera or other imaging and/or sensory technique, such as LiDAR, RADAR, etc.) the parking operation can enable the user to identify one or more potential collisions with objects or features in the operating environment.

The cooperative backup assist system 107 may provide control capability to halt the trailer backup maneuver at any time, via any connected spotting device (e.g., device(s) 108, 114, and/or 118). The proposed architecture of the cooperative backup assist system 107 can improve ReTMA control capability by using multiple devices 108, 114, and 118, etc., which may be operated by the plurality of secondary users (e.g., spotter devices) 114, 118, etc., to control the vehicle 102 and perform the trailer parking operation while reducing the likelihood of collisions with the obstacles 105 and 107.

The trailer backup assist system may be configured to steer the vehicle 102 automatically or manually to guide the trailer 104 on the desired curvature or back-up path as a driver (e.g., the user 106) operates the cooperative backup assist system 107 to control the operating speed and curvature path for the vehicle 102. The cooperative backup assist system 107 may monitor the dynamics of the trailer 104 using sensory output from the vehicle sensory devices 113A, 113B and/or 117, and/or trailer sensory output from the trailer sensory devices 120 and/or 122, such as a yaw rate, and communicates with the control module 110 disposed onboard the vehicle 102. The trailer backup assist system 107, according to such an embodiment, may also include a vehicle sensor system (e g, similar or identical to the vehicle sensory system 294 as shown with respect to FIG. 2) that can generate information used for navigation such as, for example, a vehicle yaw rate and a vehicle speed.

Figure 2:
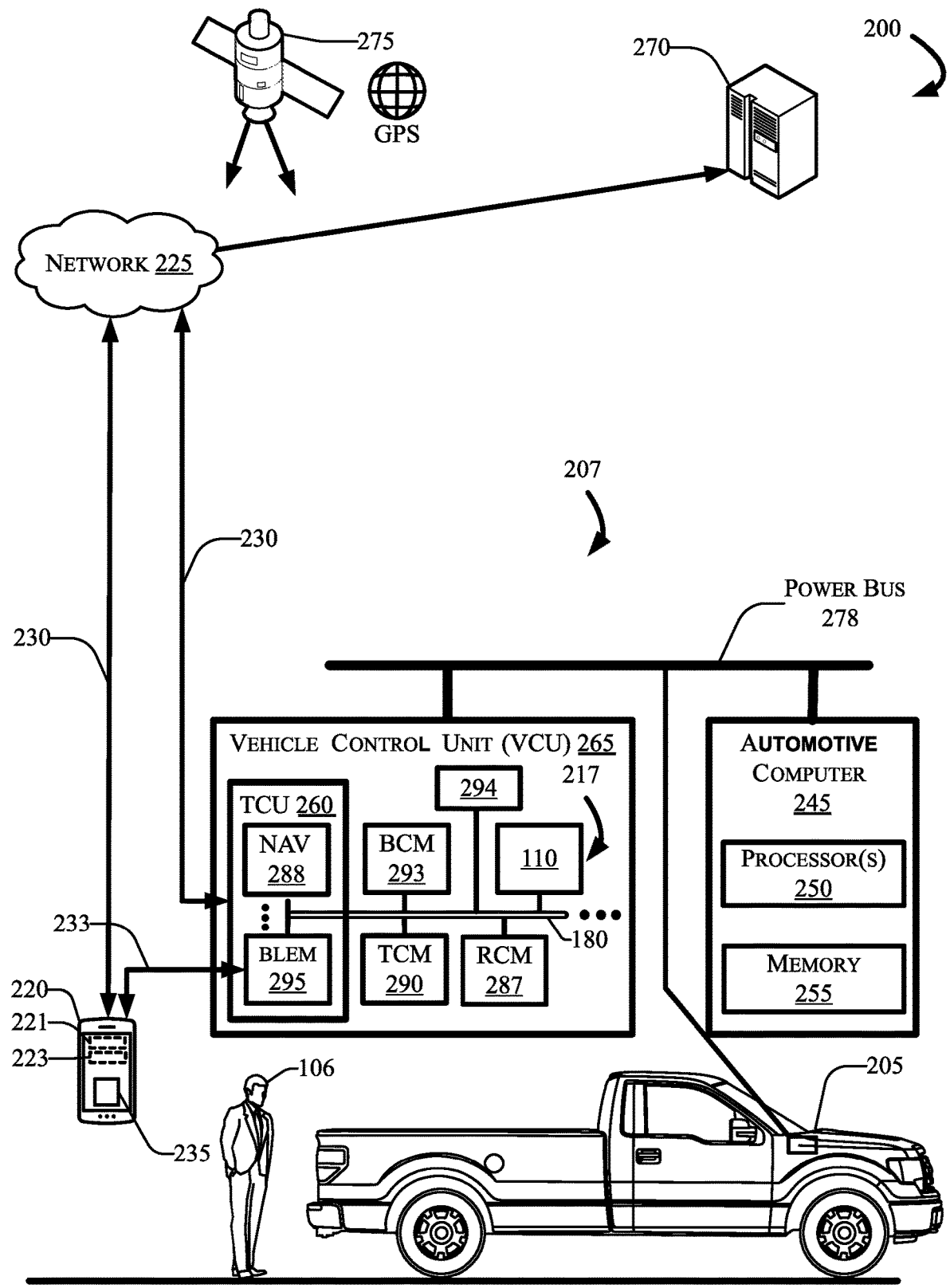
FIG. 2 depicts an example computing environment in which techniques and structures for providing the systems and methods disclosed herein may be implemented.

Prior to discussing further embodiments of the present disclosure in greater detail, a brief discussion of system components and functionality shall be discussed with respect to FIG. 2.

FIG. 2 depicts an example computing environment 200 that can include the vehicle 205 operating as part of a cooperative backup assist system 207. The cooperative backup assist system 207 may be substantially similar or identical to the cooperative backup assist system 107 described with respect to FIGS. 1A-1D. The vehicle 205 may include an automotive computer 245, a vehicle sensory system 294 that can include RADAR, LiDAR, camera, (IMUs), and other sensory devices, and a Vehicle Control Unit (VCU) 265 that typically includes a plurality of electronic control units (ECUs) 217 disposed in communication with the automotive computer 245 and backup assist system 207 as shown in FIGS. 1C and 1D.

A mobile device 220, which may be associated with a user 106 and the vehicle 102, may connect with the automotive computer 245 using wired and/or wireless communication protocols and transceivers (not shown in FIG. 2). The mobile device 220 may be substantially similar or identical to the devices 108, 114, and 118 as described with respect to FIGS. 1A-1D, and/or devices 308, 314, and 318 as described with respect to FIG. 3. The mobile device 220 may be communicatively coupled with the vehicle 205 via one or more network(s) 225, which may communicate via one or more wireless channel(s) 230, and/or may connect with the vehicle 102 and/or other connected mobile devices (such as the devices 114 and/or 118 as shown in FIG. 1) using near field communication (NFC) protocols, Bluetooth® protocols, Wi-Fi, UWB, and other possible localization, device connection and communication, and data sharing techniques. The vehicle 102 may also receive and/or be in communication with a Global Positioning System (GPS) 275.

The automotive computer 245 may be or include an electronic vehicle controller having one or more processor(s) 250 and memory 255. The automotive computer 245 may, in some example embodiments, be disposed in communication with the mobile devices 108, 114 and/or 118, and one or more server(s) 270. The server(s) 270 may be part of a cloud-based computing infrastructure, and may be associated with and/or include a Telematics Service Delivery Network (SDN) that provides digital data services to the vehicle 102.

Although illustrated as a pickup truck, the vehicle 205 may take the form of another passenger or commercial automobile such as, for example, a car, a crossover vehicle, a sport utility, a van, a minivan, a taxi, a bus, etc., and may be configured to include various types of automotive drive systems. Exemplary drive systems can include various types of internal combustion engine (ICE) powertrains having a gasoline, diesel, or natural gas-powered combustion engine with conventional drive components such as, a transmission, a drive shaft, a differential, etc. In another configuration, the vehicle 205 may be configured as an electric vehicle (EV). More particularly, the vehicle 102 may include a battery EV (BEV) drive system, or be configured as a hybrid EV (HEV) having an independent onboard power plant, a plug-in HEV (PHEV) that includes a HEV powertrain connectable to an external power source, and/or includes a parallel or series hybrid powertrain having a combustion engine power plant and one or more EV drive systems. HEVs may further include battery and/or super capacitor banks for power storage, flywheel power storage systems, or other power generation and storage infrastructure. The vehicle 205 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 205 may be a manually driven vehicle, and/or be configured to operate in a fully autonomous (e.g., driverless) mode (e.g., level-5 autonomy) or in one or more partial autonomy modes. Examples of partial autonomy modes are widely understood in the art as autonomy Levels 1 through 5. An autonomous vehicle (AV) having Level-1 autonomy may generally include a single automated driver assistance feature, such as steering or acceleration assistance. Parking assist systems may be included as one such Level-1 autonomous system. Adaptive cruise control is another example of a Level-1 autonomous system that can include aspects of both acceleration and steering. Level-2 autonomy in vehicles may provide partial automation of steering and acceleration functionality, where the automated system(s) are supervised by a human driver that performs non-automated operations such as braking and other controls. Level-3 autonomy in a vehicle can generally provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. The cooperative backup assist system 207 may further include Level-3 autonomy features. Level-4 autonomy includes vehicles having high levels of autonomy that can operate independently from a human driver, but still include human controls for override operation. Level-4 automation may also enable a self-driving mode to intervene responsive to a predefined conditional trigger, such as a road hazard or a system event. Level-5 autonomy is associated with autonomous vehicle systems that require no human input for operation, and generally do not include human operational driving controls.

According to embodiments of the present disclosure, the cooperative backup assist system 207 may be configured to operate with a vehicle having a Level-1 through Level-5 autonomous vehicle controller (not shown in FIG. 2).

The mobile device 220 generally includes a memory 223 for storing program instructions associated with an application 235 that, when executed by a mobile device processor 221, performs aspects of the disclosed embodiments. The application (or "app") 235 may be part of the cooperative backup assist system 207, or may provide information to and/or receive information from the cooperative backup assist system 207.

In some aspects, the mobile device 220 may communicate with the vehicle 102 through the one or more wireless channel(s) 230, which may be encrypted and established between the mobile device 220 and a Telematics Control Unit (TCU) 260. The mobile device 220 may communicate with the TCU 260 using a wireless transmitter (not shown in FIG. 2) associated with the TCU 260 on the vehicle 102. The transmitter may communicate with the mobile device 220 using a wireless communication network such as, for example, the one or more network(s) 225. The wireless channel(s) 230 are depicted in FIG. 2 as communicating via the one or more network(s) 225, and via one or more direct channel(s) 233. The direct wireless channel(s) 233 may include various low-energy protocols including, for example, Bluetooth®, BLE, or other Near Field Communication (NFC) protocols. For example, the system 307 may send and/or receive command control signals between connected devices 108, 114, and/or 118, and from and to the control module 110.

The network(s) 225 illustrate an example of a communication infrastructure in which the connected devices discussed in various embodiments of this disclosure may communicate. The network(s) 225 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The automotive computer 245 may be installed in an engine compartment of the vehicle 102 (or elsewhere in the vehicle 102) and operate as a functional part of the cooperative back-up assist system 207, in accordance with the disclosure. The automotive computer 245 may include one or more processor(s) 250 and a computer-readable memory 255.

The one or more processor(s) 250 may be disposed in communication with one or more memory devices disposed in communication with the respective computing systems (e.g., the memory 255 and/or one or more external databases not shown in FIG. 2). The processor(s) 250 may utilize the memory 255 to store programs in code and/or to store data for performing aspects in accordance with the disclosure. The memory 255 may be a non-transitory computer-readable memory. The memory 255 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.)

The VCU 265 may share a power bus 278, and may be configured to coordinate the data between vehicle 102 systems, connected servers (e.g., the server(s) 270), and other vehicles (not shown in FIG. 2) operating as part of a vehicle fleet. The VCU 265 can include or communicate with any combination of the ECUs 217, such as, for example, the backup control module 110 as shown in FIG. 1, a Body Control Module (BCM) 293, a Transmission Control Module (TCM) 290, the TCU 260, a Restraint Control Module (RCM) 287, etc. In some aspects, the VCU 265 may control aspects of the vehicle 102, and implement one or more instruction sets received from the application 235 operating on the mobile device 220, from one or more instruction sets received from the cooperative backup assist system 207, and/or from instructions received from an AV controller (not shown in FIG. 2).

The TCU 260 can be configured to provide vehicle connectivity to wireless computing systems onboard and offboard the vehicle 102 such as those disposed in the mobile device 220, and may include a Navigation (NAV) receiver 288 for receiving and processing a GPS signal from the GPS 275, a Bluetooth® Low-Energy (BLE) Module (BLEM) 295, a Wi-Fi transceiver, an Ultra-Wide Band (UWB) transceiver, and/or other wireless transceivers (not shown in FIG. 2) that may be configurable for wireless communication between the vehicle 102 and other systems, computers, and modules, such as spotting devices 108, 114 and 118. The TCU 260 may be disposed in communication with the ECUs 217 by way of a bus 180. In some aspects, the TCU 260 may retrieve data and send data as a node in a CAN bus.

The BLEM 295 may establish wireless communication using Bluetooth® and Bluetooth® Low-Energy® communication protocols by broadcasting and/or listening for broadcasts of small advertising packets, and establishing connections with responsive devices that are configured according to embodiments described herein. For example, the BLEM 295 may include Generic Attribute Profile (GATT) device connectivity for client devices that respond to or initiate GATT commands and requests, and connect directly with the mobile device 220.

The bus 180 may be configured as a Controller Area Network (CAN) bus organized with a multi-master serial bus standard for connecting two or more of the ECUs 217 as nodes using a message-based protocol that can be configured and/or programmed to allow the ECUs 217 to communicate with each other. The bus 180 may be or include high-speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 217 may communicate with a host computer (e.g., the automotive computer 245, the cooperative backup assist system 207, and/or the server(s) 270, etc.), and may also communicate with one another without the necessity of a host computer. The bus 180 may connect the ECUs 217 with the automotive computer 245 such that the automotive computer 245 may retrieve information from, send information to, and otherwise interact with the ECUs 217 to perform steps described according to embodiments of the present disclosure. The bus 180 may connect CAN bus nodes (e.g., the ECUs 217) to each other through a two-wire bus, which may be a twisted pair having a nominal characteristic impedance. The bus 180 may also be accomplished using other communication protocol solutions, such as Media Oriented Systems Transport (MOST) or Ethernet. In other aspects, the bus 180 may be a wireless intra-vehicle bus.

The VCU 265 may control various loads directly via the bus 180 communication or implement such control in conjunction with the BCM 293. The ECUs 217 described with respect to the VCU 265 are provided for exemplary purposes only, and are not intended to be limiting or exclusive. Control and/or communication with other control modules not shown in FIG. 2 is possible, and such control is contemplated.

In an example embodiment, the ECUs 217 may control aspects of vehicle operation and communication using inputs from human drivers, inputs from an autonomous vehicle controller, the cooperative backup assist system 207, and/or via wireless signal inputs received via the wireless channel(s) 233 from other connected devices such as the mobile device 220, among others. The ECUs 217, when configured as nodes in the bus 180, may each include a central processing unit (CPU), a CAN controller, and/or a transceiver (not shown in FIG. 2). For example, although the mobile device 220 is depicted in FIG. 2 as connecting to the vehicle 102 via the BLEM 295, it is possible and contemplated that the direct wireless channel(s) 233 may also or alternatively be established between the mobile device 220 and one or more of the ECUs 217 via the respective transceiver(s) associated with the module(s).

The BCM 293 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 293 may also operate as a gateway for bus and network interfaces to interact with remote ECUs (not shown in FIG. 2).

The BCM 293 may coordinate any one or more functions from a wide range of vehicle functionality, including energy management systems, alarms, vehicle immobilizers, driver and rider access authorization systems, Phone-as-a-Key (PaaK) systems, driver assistance systems, AV control systems, power windows, doors, actuators, and other functionality, etc. The BCM 293 may be configured for vehicle energy management, exterior lighting control, wiper functionality, power window and door functionality, heating ventilation and air conditioning systems, and driver integration systems. In other aspects, the BCM 293 may control auxiliary equipment functionality, and/or be responsible for integration of such functionality.

The computing system architecture of the automotive computer 245, VCU 265, and/or the cooperative backup assist system 207 may omit certain computing modules. It should be readily understood that the computing environment depicted in FIG. 2 is one example of a possible implementation according to the present disclosure, and thus, it should not be considered limiting or exclusive.

Figure 3:
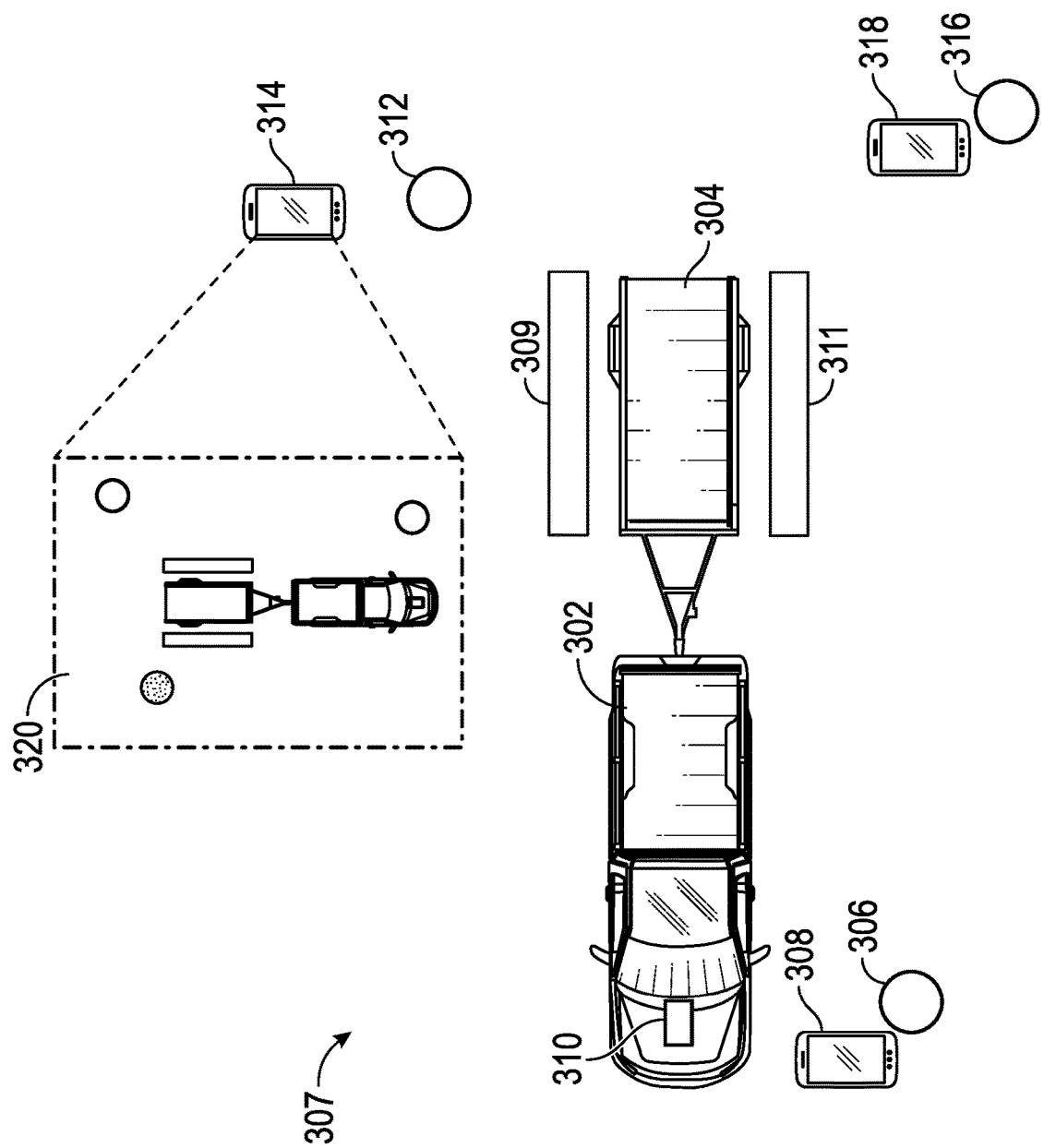
FIG. 3 depicts another example remote trailer parking maneuver in accordance with embodiments of the present disclosure.

FIG. 3 depicts a top view of a remote trailer parking maneuver, in accordance with embodiments of the present disclosure. FIG. 3 illustrates another embodiment using a connected vehicle 302 towing a trailer 304, where the vehicle 302 and trailer 304 are equipped with a cooperative backup assist system 307. The vehicle 302 may be substantially similar or identical to the vehicles 102 and 205, the trailer 304 may be substantially similar or identical to the trailers 104 and 204, and the cooperative backup assist system 307 may be substantially similar or identical to the systems 107 and 207 described with respect to FIGS. 1A-1D and FIG. 2. Moreover, the users 306, 312, and 316 may be similar to the users described in prior figures, as well as the respective devices 308, 314, and 318. The cooperative backup assist system 307 may aggregate curvature command inputs from the multiple connected devices.

The cooperative backup assist system 307 may use one or more of the following methods, which may be user-selectable using the administrator device 308. According to a first method, the cooperative backup assist system 307 may control the vehicle 302 using a device 308 for curvature input only, where the cooperative backup assist system 307 configures one or more of the rest of the connected device(s), for example, devices 314 and 318, for individual engagement input only.

In another example, the cooperative backup assist system 307 may use a second method where one device (e.g., the administrator device 308) is used for curvature input plus individual engagement inputs that demonstrate the user's 306 attention on the remote parking procedure, where the cooperative backup assist system 307 configures the other device(s) 314, 318 for individual engagement input only. For example, the system 307 may determine that one or more devices 308, 314, or 318 have not sent a command control signal indicative that a respective user is actively actuating the user engagement feature (button, gesture, etc.) as described in prior embodiments. Responsive to determining that one of the connective users may not be engaged in the trailer parking procedure, the system 307 may cause the vehicle to stop motion until all connected users are actively engaged.

According to a third embodiment, a consensus-based engagement is contemplated where two or more devices agree of the three connected devices 308, 314, and/or 318. The cooperative backup assist system 307 may determine, within a threshold of difference between control inputs received from the devices 308, 314, and/or 318, to engage a particular vehicle control action. In some aspects, the group engagement criterion may be set to have the respective curvature inputs agree within a changeable tolerance of difference with each other. By including a requirement for agreement on a vehicle control action, the cooperative backup assist system 307 may determine a higher likelihood or probability that the control instruction will result in the vehicle and/or trailer operating on a clear path.

According to an embodiment, the cooperative backup assist system 307 may reconcile slight curvature input differences by averaging the curvature inputs, or by weighting a particular curvature input according to administrative authority given to the lead operator device. Responsive to determining that any user device has generated a vehicle control instruction that adjusts a vehicle or trailer path, the cooperative backup assist system 307 may cause a human-machine interface (HMI) operating on one or more of the connected devices to share an update that a vehicle path adjustment was made by displaying an output color change and/or by generating an audible or haptic feedback output via the device(s) 308, 314, and/or 318. An illustrative HMI 320 associated with spotter device 314 is provided, showing in a map view the position of the vehicle, trailer and spotter devices, including an indication highlighting of the position of the spotting device on which the interface is displayed.

In some aspects, the cooperative backup assist system 307 may stop vehicle 302 motion when either of the following occur: (1) one or more of the connected devices 308, 314, and/or 318 determines that a respective user 306, 312, and/or 316 has lifted their finger off the curvature input area (not shown in FIG. 3) of a mobile device HMI; (2) one or more of the connected devices 308, 314, and/or 318 determines that the respective user has input a curvature command from a position that exceeds a predetermined threshold of distance from one or more other connected mobile devices; and (3) one or more of a set of established ReTMA stopping criteria are met (e.g., the system determines that an object encroachment within 30 cm of towing vehicle is imminent, the system determines an unlock trigger is engaged, the system determines that a vertical angle of the towing vehicle or the trailer has exceeded a threshold for vertical angle, etc.).

According to one or more embodiments, the cooperative backup assist system 307 may configure the connected device(s) 308, 314, and/or 318 via the application 235 (shown in FIG. 2) for interfaces with inertial-sensor-based curvature requests. For example, the HMI operative on a mobile device may include a curvature and an engagement interface element.

The group engagement criterion may require that curvature inputs respectively made to a connected mobile device (e.g., 314) be within a threshold tolerance of difference from any other mobile device curvature input. The group engagement criterion may indicate that there exists a consensus of users 108, 112, and 114 on a clear path (e.g., the path 103 as shown in prior figures) for the vehicle 302 and trailer 304, or that there is a lack of consensus of connected mobile device users for the control input that provides the clear path for the vehicle and the trailer. In one aspect, the cooperative backup assist system 307 may reconcile slight curvature input differences within the tolerance by averaging them, or by giving priority to the administrator device.

For example, with reference again to FIG. 2, the processor(s) 250 may receive localization data from the vehicle sensory system 294 indicative of one or more localized positions for obstacles and users proximate to the vehicle 205. The system 207 may determine that the mobile device 220 is the administrator device (by evaluating a user-selectable identification (not shown in FIG. 2) indicating the administrator device among two or more connected devices), and compare a curvature command from the administrator device 220 to a curvature command received from one or more secondary devices (e.g., the spotter devices 114 and/or 118 as shown in FIGS. 1A-1D).

The system 207 may average the curvature commands received from all connected devices, average the difference between the commands (e.g., by measuring an angle, distance, deviation from a planned path, or another metric), and compare the averaged difference to a predetermined threshold of curvature command difference. An example may be 2 linear feet of distance if the metric being evaluated is distance. Another example may be 10 degrees distance if the metric being measured is curvature angle. Other metrics are possible and contemplated in this disclosure.

Returning again to FIG. 3, the system 307 may determine that the difference between one or more curvature commands exceeds the average of the curvature commands, and cause the vehicle 302 to change a vehicle operation setting responsive to determining that the difference exceeds the threshold. In some aspects, the cooperative backup assist system 207 may stop the vehicle 302 motion responsive to determining that one or more triggers have occurred. For example, a first trigger may include one or more of the connected devices 308, 314, and/or 318, determining that a respective user (one of the users 306, 312, and/or 316) has lifted their finger off the curvature input area of the mobile device HMI, which may indicate a lack of user engagement to the trailer maneuver operation.

In another aspect, a second trigger may include one or more of the connected devices 308, 314, and/or 318, determining that a user has executed a curvature command that exceeds the threshold of difference from one or more curvature commands executed by the other mobile devices. In yet another aspect, a third trigger may include determining that normal ReTMA stopping criteria are met (e.g., the system detects an object encroachment within 30 cm of towing vehicle, the system detects an unlock trigger, or the system detects that the vehicle or the trailer has exceeded a vertical angle threshold, etc.).

In another aspect, the user interface may allow the administrator device to require that the other connected mobile devices provide the required input for vehicle motion and curvature. The HMI may present this selectable option from a menu selection element on a screen, by a hard button in the vehicle, by receiving a user voice command, or another type of user input or selection.

In one or more embodiments, the cooperative backup assist system 307 may identify devices capable of providing an independent user engagement signal to the administrator device 108, and provide a user selectable output that, when engaged, selects one or more of the connected mobile devices needed for vehicle motion. A user engagement signal may indicate that a user operating the sending mobile device (e.g., device 314) is actively actuating a user engagement button (not shown in FIG. 3), performing a complex gesture indicative that the user is engaged with the trailer maneuver operation, or providing another user engagement indication that may be characterized or measured using a threshold value. For example, a spotter device 314 may send, to the administrator device 308, a first user engagement signal that meets a predetermined user engagement threshold having a value of 1 (engaged or actuated).

An example of a first user engagement signal that does not meet a predetermined user engagement threshold is a user engagement value of 0 (not engaged or actuated). A non-engaged or actuated signal may be a signal responsive to the user of device 314 taking his/her finger off of the user engagement actuation button. The first user engagement threshold may be actuation of a user engagement button by the user on the spotter device 314. The cooperative backup assist system 207 may further allow the lead mobile device to add new spotter mobile devices deices.

In some aspects, the cooperative backup assist system 307 may provide an interface for the administrator to select how to enforce multiple devices. For example, multiple spotter devices 316 and/or 314 may be directed at certain locations, such as the blind vehicle corner as occupied by the second user 312. In this case, the administrator device 308 can receive a user selection or a location-based enforcement and can select the respective spotter location(s) on a map.

In another aspect, the administrator device 308 may include an interface usable for receiving user input indicative of a geofence or perimeter that localizes a position for the spotter device, chooses a radius magnitude, and/or other selectable/definable options.

The cooperative backup assist system 207 may provide one or more enforcement rules that can be based on the remote device. For example, some devices may be configured and/or programmed to command vehicle motion when another device 314 and/or 318 also provides a user engagement signal and/or curvature command. This may be desirable if certain people are less experienced with ReTMA or trailering. In turn, the lead device may designate that the rule be relaxed once a second mobile device has been used for a minimum amount of time.

According to another aspect, the cooperative backup assist system 307 may configure one or more devices 308, 314, and/or 318 with an interface (interface not shown in FIG. 3) allowing the administrator device 308 to define a minimum number of connected devices. For example, the administrator device 308 may be further programmed and/or configured to receive one or more inputs indicative of rule exceptions. For example, the administrator may set the default requirement for vehicle motion to be user engagement signals and/or curvature commands from two devices 314, 318, but designate certain locations or devices to be exempt. A device being exempt may be based on the device meeting or satisfying one or more exemption criteria or parameters, such as include a user selectable option that indicates that another device is permitted to exceed predetermined thresholds or provide curvature commands that override the administrator device. In another example of an exemption criteria or parameter, a geographically bound area may be indicated to the system that is exempt from being considered as a potential blind spot, or exempted from being considered as relevant to the parking procedure.

Furthermore, the administrator device 108 may be configured and/or programmed to designate a hierarchy of connected mobile devices. For example, the cooperative backup assist system 307 may define one or more areas of operation indicating that vehicle and/or trailer maneuverability may be so difficult to maneuver that they always require multiple devices 314, 318, even if some of the devices would normally be allowed to operate independently. Similarly, the cooperative backup assist system 307 may direct that the mobile device have another remote device that also provides a user engagement signal and curvature command to enable vehicle motion.

In another embodiment of the present disclosure, the cooperative backup assist system 307 may provide a user engagement signal that is designated as from an administrator device. For example, the cooperative backup assist system 307 may designate a minimum number of devices by evaluating, via the vehicle sensory system 294 a relative location of an obstacle or user, determine one or more blind spots based on vehicle and trailer geometry, user device positions, and localized obstructions, and determine one mobile device of the multiple connected mobile devices to be the administrator device based on having an optimal vantage point.

In another aspect, the system 307 may define particular devices to provide a user engagement signal and/or curvature command to allow vehicle motion. For example, using the exemption procedures above, the system 307 may designate devices 308 and 318 to provide curvature command, while exempting the device 314 from providing curvature command. Furthermore, the vehicle 102 may receive sensory data from the vehicle sensory system 294 indicating relative locations of the devices 108, 114, 118, or may receive localization signals from those devices that indicate their position, and require the respective devices 108, 114, and/or 118 to be spaced a minimal distance apart such that there is optimal coverage from the recommended vantage points. In another aspect, the system 307 may recommend that the devices (one or more of 108, 112, 116) be located in zones to achieve a minimal visual coverage, respectively, by the users (the driver 106, spotter 112, and spotter 116) as described in prior embodiments When one device (e.g., the administrator device 308) stops providing a user engagement signal or the curvature commands deviate beyond a curvature command threshold, the other connected devices 314 and/or 318 may alert the users 306, 312, and 316 that the vehicle motion has been stopped, and advise which device(s) needs to provide a user engagement signal to enable vehicle motion and if the curvature commands deviated too much. Using the system of FIG. 2 for explanation, the system 207 may determine, via the processor(s) 250, that the user engagement signal indicates a lack of actuation, and cause the mobile device 220 (and more particularly, the application 235) to output the advice via the mobile device HMI. Since the administrator is not providing a user engagement signal, the administrator will be able to view information of interest using his/her remote device. For example, the administrator may view the location and location history of the vehicle, trailer, and devices providing the user engagement signal.

Referring again to FIG. 3, the cooperative backup assist system 307 may further configure the administrator device 308 also view data from the vehicle 102 such as occupant locations and/or perception sensor video with object distance and classification information. By contrast, responsive to determining that one of the connected devices providing a user engagement signal is an administrator device, and/or determining that either of the connected devices stops providing a user engagement signal, the cooperative backup assist system 307 may generate an output message requesting that the respective user agree to act as the administrator device. The administrator may then choose which device(s) may command vehicle motion independently. Furthermore, the administrator device 308 may be programmed and/or configured to override minimal distance, specific zone requirements, or curvature command deviations for the administrator device 308.

In another embodiment, the vehicle 302 may identify that an area (e.g., the space between the obstacles 309 and 311) has tight clearances based on the known dimensions of the vehicle and trailer as compared to the environment. The environment may be sensed directly using the vehicle 302 and/or trailer 304 perception sensors (not shown in FIG. 3) or an obstacle map may be retrieved from a geographic database stored on the vehicle or in the cloud. For example, with reference to FIG. 2, the server(s) 270 may store an obstacle map (not shown in FIG. 2) indicative of a perceived field of obstacles, obstructions, and environmental features associated with a known geographic area in the operating environment. In one example, the system 207 may create such a map after a connected vehicle 205 operates in the environment, transmit the obstacle map to the server(s) 270, and the server(s) 270 may store the obstacle map for future use by the vehicle 205 or another connected vehicle operating in the same environment at a later time. The vehicle may also identify areas around the vehicle and trailer where there is not direct sensor coverage.

Referring again to FIG. 3, the vehicle 302 may suggest the number of devices and location zones around the vehicle 102 and trailer 104, to operate ReTMA with optimal user visual coverage around the vehicle and trailer. For example, the cooperative backup assist system 307 may determine location of objects in the operating environment using a real-time or historical map, image, sensory device information, or other stored vehicle perception input, and determine the number of devices currently configured for use as spotter devices disposed proximate to the vehicle 302 and/or the trailer 304. The cooperative backup assist system 307 may do this by localizing the spotter devices 316 and/or 318 using UWB, Bluetooth®, GPS, or other localization techniques.

The cooperative backup assist system 307 may further localize environmental features or obstacles using the sensory data, historical or real-time images, etc., using one or more known techniques. For example, the cooperative backup assist system 207 may receive, from one or more vehicle sensory devices or trailer 304 sensory devices, such as a LiDAR device, a RADAR device, vehicle camera sensor, or other type of sensory device that indicates presence and relative location of an environmental feature or obstacle to be avoided during the trailer backup maneuver.

The cooperative backup assist system 307 may determine potential probabilities for collisions based on known dimensions of the trailer 304, the vehicle 302, a curvature (or approach) angle, etc. For example, the cooperative backup assist system 307 may determine, based on the localized environmental features, obstacles (e.g., 309 and 311), and position(s) of the spotter devices one or more "tight spots" or higher probability areas for vehicle 302 or trailer 304 collisions where the potential collision may be mitigated by positioning or repositioning the configured spotter devices or by adding additional spotter devices.

To make this determination, the cooperative backup assist system 307 may determine one or more positions for devices that may improve system and/or user perception of how the vehicle 302 and trailer 304 navigates around the localized obstacle or feature.

According to the use case, where multiple devices 308, 314, and/or 318 can be used as part of a training exercise, the cooperative backup assist system 307 may allow each connected mobile device (e.g., 308, 314, 318) to maintain the lead mobile device control privileges and behavior as noted above. Such a scenario was explained in detail with respect to FIG. 1C. The cooperative backup assist system 107 may configure the device(s) 308, 314, 318 such that any respective mobile device may only: (1) allow all users to have control privileges but the Admin phone can override/trump any one of the other phones, (2) allow the admin to actually control the vehicle while providing secondary users with a mirror image of what the admin is doing, or (3) allow a mix of the above where, for example, only one of two additional spotters is assigned trainer mode but the other spotter is assigned full control.

For yet another use case, the cooperative backup assist system 307 may also recommend the best location for the spotter to stand on the ground for the best vantage point (e.g., which corner, side, front, or rear of the vehicle-trailer unit), or it may suggest that for optimum viewing one spotter should be in an elevated position (e.g., 2nd floor of a building, catwalk, etc.), or the cooperative backup assist system 107 may suggest an approximate distance from the vehicle that provides optimum viewing of potential collision points or distance constrictions (e.g., to better see overhead obstructions). The cooperative backup assist system 107 may suggest use of an unmanned aerial vehicle (e.g., a drone) to achieve an optimum vantage point. For example, if the cooperative backup assist system 107 determines that an obstacle at a rear right side of a trailer is particularly "tight" or in close proximity to a projected curvature angle needed to complete the trailer parking maneuver, the cooperative backup assist system 307 may recommend that a spotter positioned in another location or move to the rear right side of the trailer to provide a clear view of the obstacle to avoid.

In another aspect, when all spotters (and spotter devices) currently configured to participate with the administrator device are in optimal positions such that their repositioning would leave an advantageous viewing angle unviewed by a spotter device, the cooperative back-up assist system 307 may recommend adding one or more additional spotter devices, and may generate a graphic or verbal indication of the recommended position of the newly added spotter device. For example, the cooperative backup assist system 307 may generate an output indicative of the phrase "Consider Adding A Spotter Device At the Rear Right Side Of Trailer" or the like.

Figure 4:
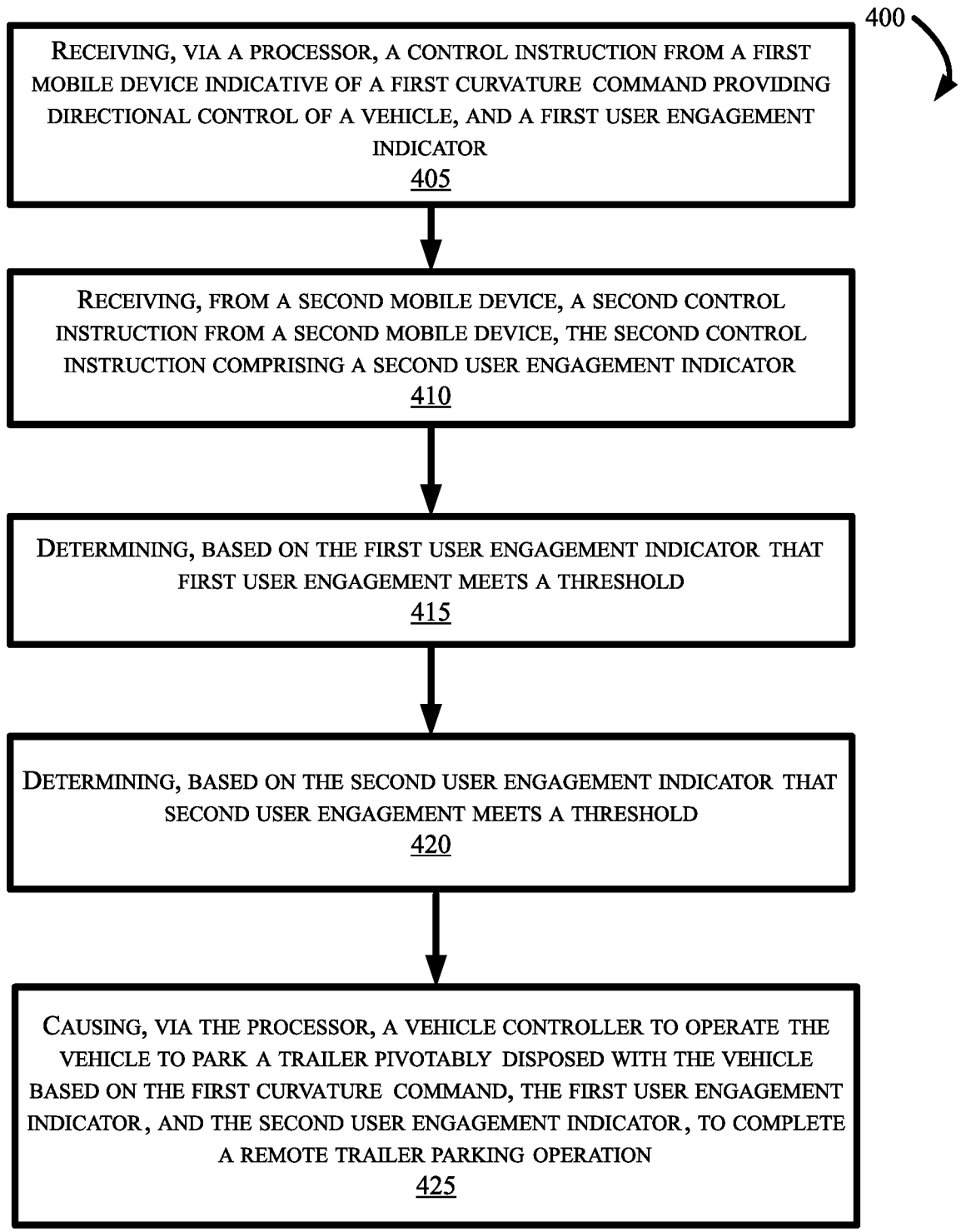
FIG. 4 depicts a flow diagram in accordance with the present disclosure.

Referring to FIG. 4 at step 405, the method 400 may commence with receiving, via a processor, a control instruction from a first mobile device indicative of a first curvature command providing directional control of a vehicle, and a first user engagement indicator. The first user engagement indicator may include values such as 0 (no user engagement is detected) indicative that the second user is not actuating a user engagement button or actively performing a complex gesture or other indicia of user engagement), or 1 (user engagement is detected).

At step 410, the method can include a step for receiving, from a second mobile device, a second control instruction from a second mobile device, the second control instruction comprising a second user engagement indicator. The second user engagement indicator may include values such as 0 (no user engagement is detected) indicative that the second user is not actuating a user engagement button or actively performing a complex gesture or other indicia of user engagement), or 1 (user engagement is detected).

At step 415, the method can include a step for determining, based on the first user engagement indicator that first user engagement meets a threshold. For example, this step may include determining that the first user device has provided a signal indicative that a user engagement feature is pressed, motioned, gestured, actuated, etc. At step 420, the method can include a step for determining, based on the second user engagement indicator that second user engagement meets a threshold. For example, this step may include determining that the second user device has provided a signal indicative that a user engagement feature is pressed, motioned, gestured, actuated, etc.

At step 425, the method can include a step for causing, via the processor, a vehicle controller to operate the vehicle to park a trailer pivotably disposed with the vehicle based on the first curvature command, the first user engagement indicator, and the second user engagement indicator, to complete a remote trailer parking operation. This step may include receiving, via the processor, a second curvature command from the second mobile device, and causing the vehicle controller to operate the vehicle based on the first and second control instructions. In some aspects, the step may further include aggregating the first control instruction and the second control instruction, and causing the vehicle controller to operate the vehicle based on the aggregated first and second control instructions, aggregating the first control instruction and the second control instruction, and causing the vehicle controller to operate the vehicle based on the aggregated first and second control instructions.

In one example embodiment, the aggregating step includes determining an engagement consensus for aspects of the control commands received as the first control instruction and the second control instruction. The system may aggregate the signals by determining, via the processor, that one of the first user engagement indicator and the second user engagement indicator meets a third threshold, such as an agreement within threshold limits of the curvature command. For example, the aggregation may include averaging the first and second curvature control commands, determining if the aggregated or averaged difference is within a predetermined tolerance to any one or more other control instructions, and stopping the vehicle responsive to determining that the averaged curvature command is outside of a predetermined tolerance when compared to the first and second curvature control commands.

In another aspect, this step further includes determining that a position of the first mobile device meets a device localization rule, determining that a second position associated with a location of the second mobile device meets the device localization rule; and causing the vehicle controller to operate based on the device localization rule. This may include localizing one or more users respective to a position of the vehicle and/or the trailer, localizing one or more obstacles in the operating environment, and evaluating whether any of the users have an obstructed view of the vehicle as it becomes proximate to one or more of the obstacles. For example, the step may include evaluating the position of users and obstacles, and determining, based on data indicative of the vehicle and trailer dimensions, that one or more users are unable to see the obstacle in a present location. The system may determine a second position at which one or more of the users may be positioned to alleviate the obstructed view, stop the vehicle, and output an instruction via one or more mobile devices indicative of a recommended user position. Responsive to determining that the blind spot is now viewable by one or more users, the step may include causing the vehicle to complete the parking maneuver.

In another aspect, this step may further include determining that a third user may alleviate the obstructed view, and recommend that a third user and/or user device be used to complete the parking maneuver. The system may further generate a recommendation of a position for the third user based on localization data indicative of a position of the obstruction, the first, user, the second user, the vehicle, and/or the trailer.

Embodiments described herein can provide ways to integrate a trailer birds-eye view video feed with existing wiring hardware and control modules onboard a towing vehicle without the need to add additional wiring connections. The disclosed methods and system may be useful because they provide a better user experience for those that may wish to view the trailer at a birds-eye view similar to features in the towing vehicle, and without adding additional wiring connections or an upgraded control module onboard the towing vehicle.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
receiving, via a processor, a first control instruction from a first mobile device indicative of a first curvature command providing directional control of a vehicle, and a first user engagement indicator;
receiving a second control instruction from a second mobile device, the second control instruction comprising a second user engagement indicator;
determining, based on the first user engagement indicator that first user engagement meets a first threshold;
determining, based on the second user engagement indicator that second user engagement meets a second threshold; and
causing, via the processor, a vehicle controller to operate the vehicle to park a trailer pivotably disposed with the vehicle based on the first curvature command, the first user engagement indicator, and the second user engagement indicator.

2. The method according to claim 1, further comprising:
receiving, via the processor, a second curvature command from the second mobile device; and
causing the vehicle controller to operate the vehicle based on the first control instruction and the second control instruction.

3. The method according to claim 2, wherein causing the vehicle controller to operate the vehicle based on the first control instruction and the second control instruction comprises:
   aggregating the first control instruction and the second control instruction; and
   causing the vehicle controller to operate the vehicle based on the aggregated first and second control instructions.

4. The method according to claim 3, further comprising:
   receiving a third control instruction from a third mobile device;
   determining that the third mobile device is exempt from input to an aggregated control instruction.

5. The method according to claim 4, where determining that the third mobile device is exempt includes determining the third mobile device is exempt based on at least one of a location of the third mobile device or a determination that a device meets an exemption criteria.

6. The method according to claim 1, further comprising:
   receiving, from the second mobile device, a third control instruction, the third control instruction comprising a third user engagement indicator;
   determining, via the processor, that the third user engagement indicator meets a third threshold; and
   stopping the vehicle.

7. The method according to claim 2,
   wherein causing the vehicle controller to operate the vehicle is based on the first curvature command being within a threshold difference from the second curvature command.

8. The method according to claim 1, further comprising:
   determining that a first location associated with the first mobile device meets a device localization rule;
   determining that a second position associated with a second location associated with the second mobile device meets the device localization rule.

9. The method according to claim 1, wherein that the first mobile device is an administrator device, further comprising:
   receiving, via the processor, information indicative of the second mobile device authorized to control the vehicle controller to operate the vehicle based on the aggregated first and second control instructions; and
   causing, via the processor, the vehicle controller to operate the vehicle to park the trailer based on the first curvature command, the first user engagement indicator, the second user engagement indicator, and the information indicative of the second mobile device authorized to control the vehicle controller.

10. The method according to claim 9, further comprising:
    receiving, from the first mobile device, information indicative of a third location to where the second mobile device is to be positioned; and
    sending, to the second mobile device, information indicative of the third location to where the second mobile device is to move, the information configured to be presented by the second mobile device in a map view.

11. The method according to claim 10, wherein the information indicative of the third location was received as user input by the first mobile device.

12. The method according to claim 11, wherein receiving, from the first mobile device, information indicative of the third location to where the second mobile device is to be positioned comprises:
    receiving information indicative of a perimeter around the third location that was received as user input by the first mobile device.

13. The method according to claim 1, wherein the first mobile device is an administrator device, further comprising:
    receiving, from the first mobile device, information indicative that the second mobile device is authorized to maneuver the vehicle based on a single curvature command; and
    causing, via the processor, the vehicle controller to operate the vehicle to park the trailer further based on a curvature command from the second mobile device.

14. The method according to claim 1, further comprising:
    sending, to the first mobile device, information configured to be presented by the first mobile device by a human-machine interface configured to receive input for controlling an operation of the vehicle.

15. The method according to claim 1, further comprising:
    sending, to the first mobile device, information indicative of a location of the second mobile device and configured to be presented by the first mobile device.

16. The method according claim 1 further comprising:
    sending, to the first mobile device, information indicative of a control input received from the second mobile device and configured for presentation by the first mobile device, wherein the presentation identifies the control input as an adjustment to the first control instruction or the second control instruction.

17. A system, comprising:
    a control module disposed in a vehicle; and
    a memory disposed in the control module, storing executable instructions that cause the control module to execute the executable instructions to:
       receive a first control instruction from a first mobile device indicative of a first curvature command providing directional control of the vehicle, and a first user engagement indicator;
       receive a second control instruction from a second mobile device, the second control instruction comprising a second user engagement indicator;
       determine, based on the first user engagement indicator that first user engagement meets a first threshold;
       determine, based on the second user engagement indicator that second user engagement meets a second threshold; and
       cause, via the control module, a vehicle controller to operate the vehicle to park a trailer pivotably disposed with the vehicle based on the first curvature command, the first user engagement indicator, and the second user engagement indicator.

18. The system according to claim 17, wherein the instructions are further configured to cause the control module to execute the executable instructions to:
    receive, at the control module, a second curvature command from the second mobile device; and
    cause the vehicle controller to operate the vehicle based on the first control instruction and the second control instruction.

19. The system according to claim 17, wherein the instructions are further configured to execute the executable instructions to:
    aggregate the first control instruction and the second control instruction; and
    cause the vehicle controller to operate the vehicle based on the aggregated first and second control instructions.

20. The system according to claim 17, wherein the instructions are further configured to execute the executable instructions to:

receive a third control instruction from a third mobile device;
determine that the third mobile device is exempt from input to an aggregated control instruction.

21. The system according to claim 20, wherein the instructions for determining that the third mobile device is exempt include instruction to determine the third mobile device is exempt based on at least one of a location of the third mobile device or determination a device meets an exemption criteria.

22. The system according to claim 17, wherein the instructions are further configured to execute the executable instructions to:
determine that one of the first user engagement indicator and the second user engagement indicator meets a third threshold; and
stop the vehicle.

23. The system according to claim 17, wherein causing the vehicle controller to operate the vehicle is based on the first curvature command being within a threshold difference from a second curvature command.

24. The system according to claim 17, wherein the instructions are further configured to execute the executable instructions to:
determine that a first location associated with the first mobile device meets a device localization rule;
determine that a second position associated with a second location associated with the second mobile device meets the device localization rule; and
cause the vehicle controller to operate based on the device localization rule.

25. The system according to claim 17, wherein the first mobile device is an administrator device, wherein the instructions are further configured to execute the executable instructions to:
receive information indicative of the second mobile device authorized to control the vehicle controller to operate the vehicle based on the aggregated first and second control instructions; and
cause the vehicle controller to operate the vehicle to park the trailer based on the first curvature command, the first user engagement indicator, the second user engagement indicator, and the information indicative of the second mobile device authorized to control the vehicle controller.

26. The system according to claim 25, wherein the instructions are further configured to execute the executable instructions to:
receive, from the first mobile device, information indicative of a third location to where the second mobile device is to be positioned; and
send, to the second mobile device, information indicative of the third location to where the second mobile device is to move, the information configured to be presented by the second mobile device in a map view.

27. The system according to claim 26, wherein the information indicative of the third location was received as user input by the first mobile device.

28. The system according to claim 27, wherein the instructions for receiving, from the first mobile device, information indicative of the third location to where the second mobile device is to be positioned includes instructions to:
receive information indicative of a perimeter about the third location that was received as user input by the first mobile device.

29. The system according to claim 17, wherein the first mobile device is an administrator device, the instructions are further configured to execute the executable instructions to:
receive, from the first mobile device, information indicative that the second mobile device is authorized to maneuver the vehicle based on a single curvature command; and
cause the vehicle controller to operate the vehicle to park the trailer further based on a curvature command from the second mobile device.

30. The system according to claim 17, wherein the instructions are further configured to execute the executable instructions to:
send, to the first mobile device, information configured to be presented by the first mobile device by a human-machine interface that is configured to receive input for controlling an operation of the vehicle.

31. The system according to claim 17, wherein the instructions are further configured to execute the executable instructions to:
send, to the first mobile device, information indicative of a location of the second mobile device, the information configured to be presented by the first mobile device.

32. The system according to claim 17, wherein the instructions are further configured to execute the executable instructions to:
send, to the first mobile device, information indicative of a control input received from the second mobile device and configured for presentation by the first mobile device, wherein the presentation identifies the control input as an adjustment to the first control instruction or the second control instruction.

33. A non-transitory computer-readable storage medium in a vehicle control module, the non-transitory computer-readable storage medium having instructions stored thereupon which, when executed by the vehicle control module:
receive a first control instruction from a first mobile device indicative of a first curvature command providing directional control of a vehicle, and a first user engagement indicator;
receive, from a second mobile device, a second control instruction from the second mobile device, the second control instruction comprising a second user engagement indicator;
determine, based on the first user engagement indicator that first user engagement meets a first threshold;
determine, based on the second user engagement indicator that second user engagement meets a second threshold; and
cause a vehicle controller to operate the vehicle to park a trailer pivotably disposed with the vehicle based on the first curvature command, the first user engagement indicator, and the second user engagement indicator.

34. The non-transitory computer-readable storage medium according to claim 33, further comprising causing the vehicle control module to:
receive a second curvature command from the second mobile device; and
cause the vehicle controller to operate the vehicle based on the first control instruction and the second control instruction.

* * * * *